United States Patent [19]
Gardner

[11] 3,738,717
[45] June 12, 1973

[54] FLEXIBLE PAD JOURNAL BEARING
[75] Inventor: Willis W. Gardner, Waukesha, Wis.
[73] Assignee: Waukesha Bearings Corporation, Waukesha, Wis.
[22] Filed: Sept. 27, 1971
[21] Appl. No.: 184,073

[52] U.S. Cl. ............................................. 308/122
[51] Int. Cl. ......................................... F16c 17/02
[58] Field of Search ............................... 308/122, 9

[56] References Cited
UNITED STATES PATENTS
3,215,480    11/1965    Marley............................... 308/121
3,434,762    3/1969     Marley................................. 308/73

Primary Examiner—Charles J. Myhre
Assistant Examiner—Frank Susko
Attorney—Morsell & Morsell

[57] ABSTRACT

A pad type journal bearing that provides both flexibility and damping for the control of vibrations of a relatively high speed shaft. The flexible pads are arcuate in shape and are spaced in endwise relationship around the shaft within a circular channel in an annular bearing shell or housing. The radius of curvature of the bore of the pads is slightly larger than the radius of the shaft and the radius of the outer surface of the pads is slightly larger than the radius of the channel in which the pads are seated. The radial thickness of the pads is less than the radial distance between the shaft and the channel bottom. Vibrations of the shaft are transmitted as dynamic loads through the hydrodynamic oil film to the pads. Due to the pad construction and beam-type support, the pads deflect in the central portion when subjected to a load as from the rotor (shaft) weight and/or dynamic loads as from shaft vibration.

Dynamic deflections (vibrations) of the pads alternately squeeze and expand the oil in the space between the pad outer surface and the housing bore. Thus, this bearing design uniquely provides both support flexibility and squeeze film damping necessary for the control of vibrations of high speed rotors.

6 Claims, 3 Drawing Figures

PATENTED JUN 12 1973 3,738,717

INVENTOR.
WILLIS W. GARDNER
BY
Morsell & Morsell
ATTORNEYS

FLEXIBLE PAD JOURNAL BEARING

BACKGROUND OF THE INVENTION

This invention relates to flexible pad journal bearings for use in relatively high speed rotating machinery systems. In rotating machinery systems such as steam turbines, gas turbines, compressors, or the like, there is often an increase in shaft vibration as the speed of rotation is increased. Therefore, in order to operate the system at high speeds, it is necessary to provide bearings which are capable of limiting these relatively high levels of vibration. In the past, various bearing types and constructions, including lobe type, tilting pad, flexible mountings, and squeeze film damping mountings have been used with varying degrees of success to control various rotor vibration problems. It is the object of this invention to extend the speed range of such bearing and mounting constructions by providing a pad type journal bearing that utilizes a combination of support flexibility and "squeeze film" oil damping to permit operation at higher speeds than heretofore known in the art and to provide improved vibration absorption characteristics.

Another object of this invention is to provide a flexible pad journal bearing of the above-noted type which is sturdy in structure, reliable in operation, and relatively inexpensive in cost.

SUMMARY OF THE INVENTION

In accordance with this invention, the above-noted objects are achieved by providing arcuate-shaped flexible pads which have radii of curvature slightly larger than the radius of the shaft and the radius of the channel within which the arcuate pads are seated. The channel in which the pads are seated is formed in an annular bearing shell or housing and the arcuate-shaped pads are positioned in endwise relationship around the shaft within the channel. The radial thickness of the pads is less than the radial distance between the shaft and the channel bottom. When the shaft vibrates (or whirls) within the bearing clearance, it dynamically loads and deflects the center of the pad, and this motion is transmitted to the oil in the space between the pad outer surface and the housing bore. Thus a beam-type loading of the arcuate pads is provided which enables them to flex and so to absorb the vibrations of the shaft. In flexing, however, the arcuate-shaped pads act on the oil that is trapped between the outer surface of the pad and the bottom of the channel in which the pads are seated and this produces a "squeeze film" oil damping that enhances the vibration damping characteristics of the bearing. For a vertical or lightly-loaded shaft this design presents a "lobe"-type bearing which is "half-frequency whirl resistant." For a loaded shaft, the pad in the direction of the load deflects due to the loaded beam action, changing the curvature and presenting to the shaft a configuration approaching that of a plain sleeve bearing which has higher load capacity than a lobe-type bearing. Thus, as the load increases, the load capacity increases. As the load decreases, and the whirl tendency of the rotor increases, the bearing becomes more "whirl resistant." The amount of flexibility and damping desired for a particular application depends upon the rotor characteristics. The design is such, however, that both the flexibility and damping can be changed readily by changes in dimensions.

DETAILED DESCRIPTION OF THE INVENTION

Figure 2:
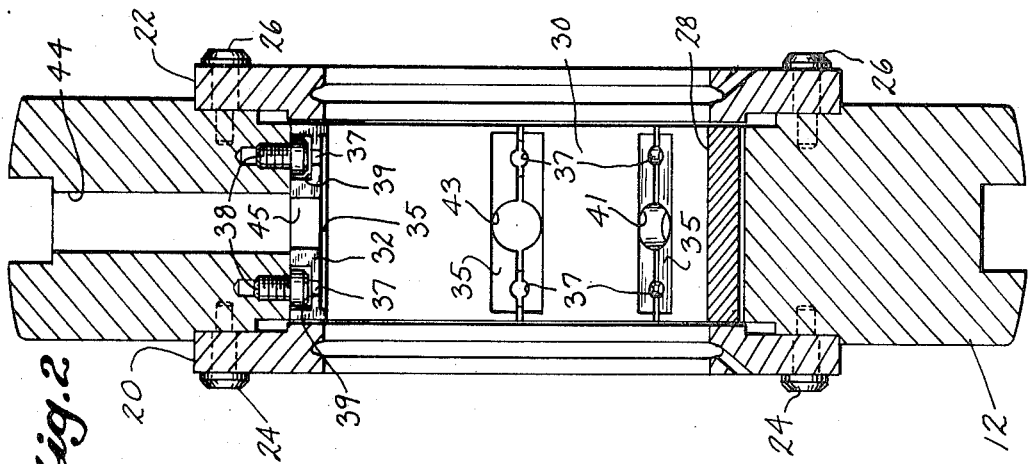
FIG. 2 is a cross-sectional view taken on the line 2—2 of FIG. 1.
Figure 1:
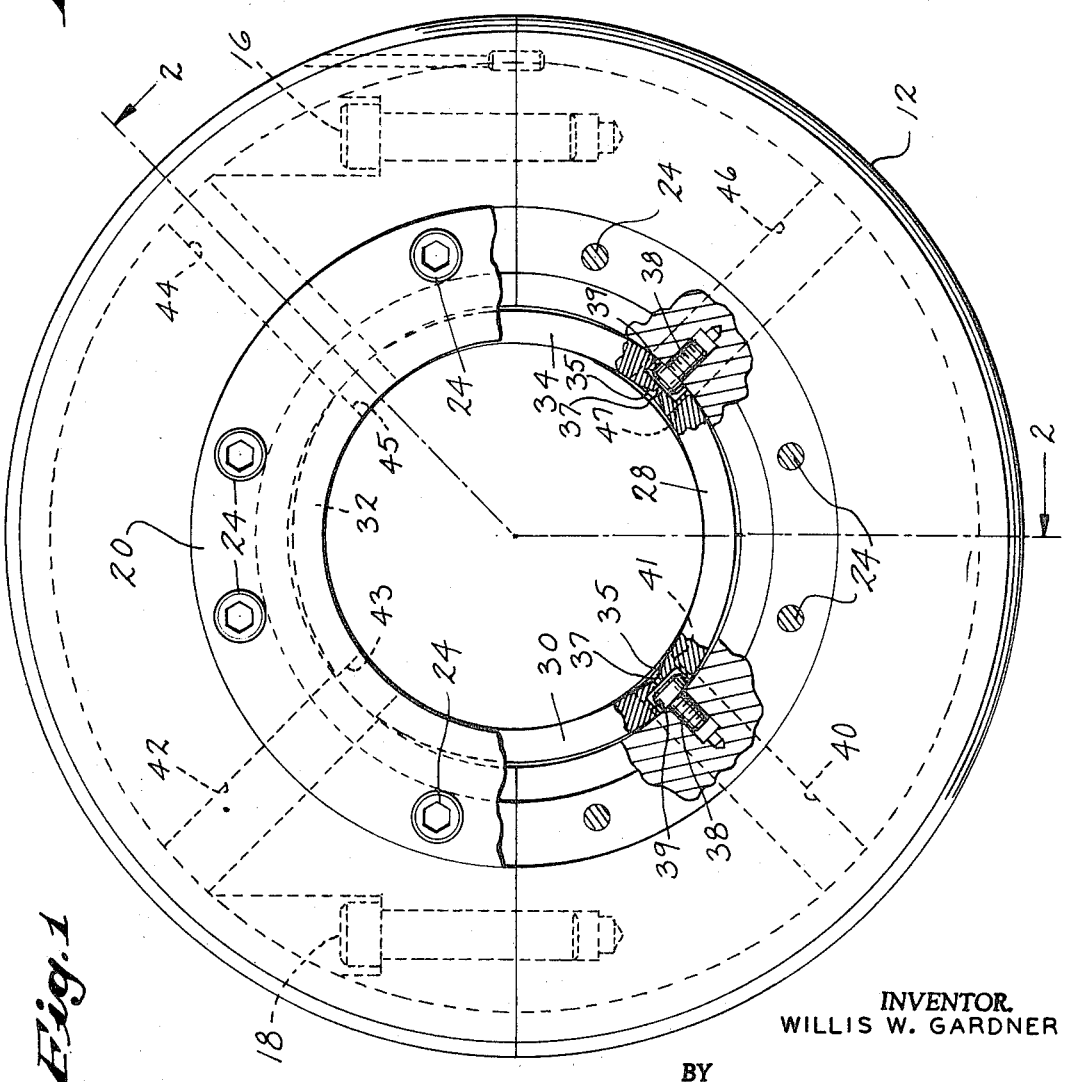
FIG. 1 is a partially cut-away plan view of one illustrative embodiment of the invention.

Referring to FIGS. 1 and 2, one illustrative journal bearing of this invention comprises an annular bearing shell or housing member 12 which is made in two 180° segments that are held together by means of machine screws 16 and 18. Two annular end plates 20 and 22 are fastened to the inside edges of the annular bearing housing 12 by means of machine screws 24 and 26. The sides of end plates 20 and 22 and the bottom of the annular bearing housing 12 form a pad-receiving channel into which four metal pads 28, 30, 32, and 34 are fitted in endwise relationship around the inner periphery of the housing 12. The pads 28, 30, 32, and 34 are designed to provide both flexibility and "squeeze film" oil damping for the control of vibrations of a shaft in the center of the bearing. This is done by adapting the dimensions of the pads so that they will provide beam-type mechanical flexible support for vibrations of the shaft and "squeeze film" oil damping for vibrations of the pad. The pads are formed of metal having flexing characteristics which are suitable for the loads to be encountered. Any of the common bearing materials can be used, but bearing aluminum is preferable in this embodiment of the invention. The modulus of elasticity of the pad material is an important characteristic in this design as it influences the load deflection (flexibility) characteristics of the pad. Aluminum is advantageous in that its low modulus requires thicker pads (as compared with steel-backed pads) and this simplifies manufacturing. Elimination of a babbiting process also simplifies the manufacture. The high heat conductivity of aluminum as compared to the other common bearing materials results in lower operating temperatures. In general, with this design, the choice of material will influence the pad dimensions necessary to obtain the flexibility desired for a particular application.

Figure 3:
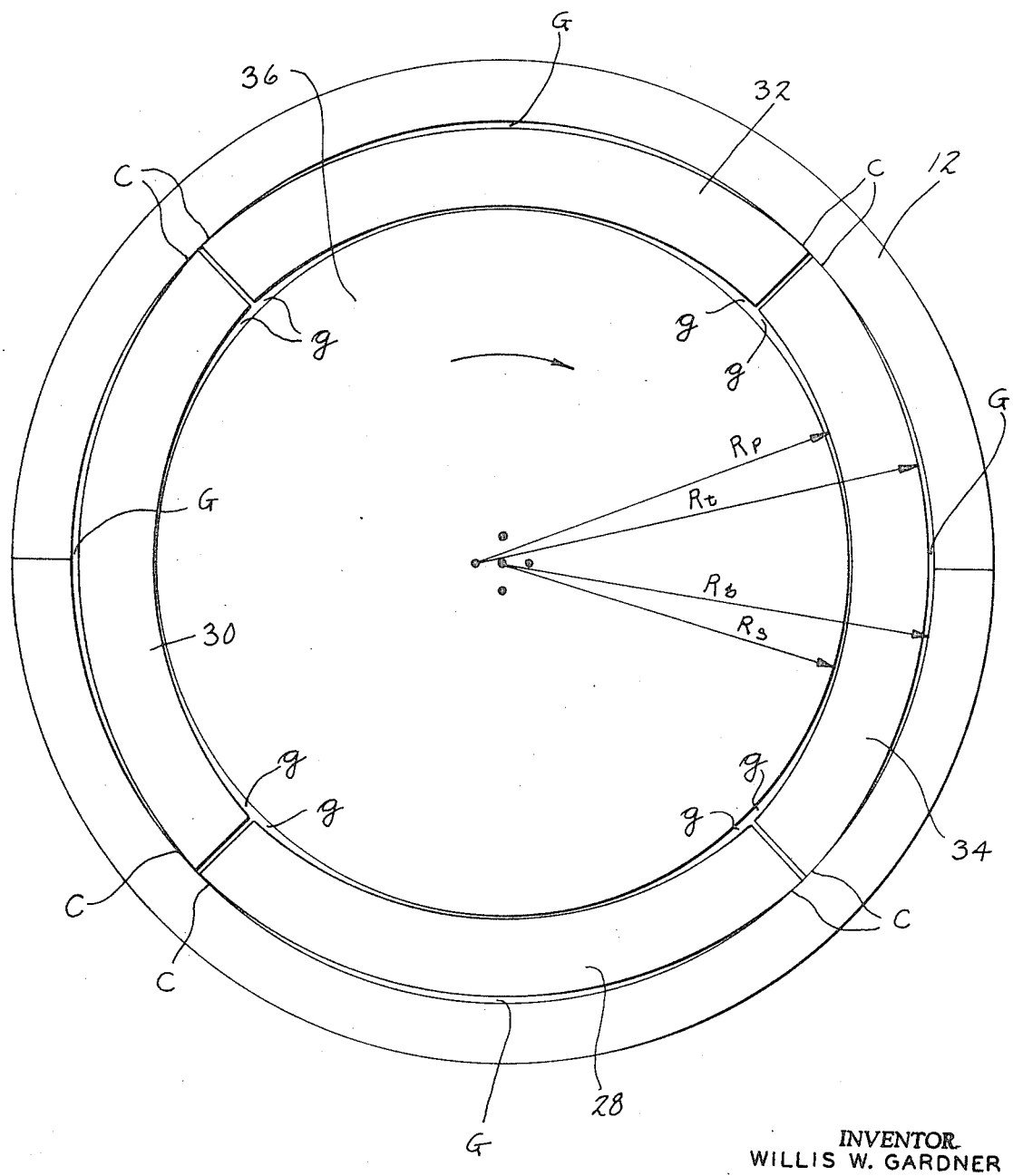
FIG. 3 is a diagrammatic representation of the bearing pads and bearing housing of FIGS. 1 and 2 illustrating their radii of curvature.

FIG. 3 is a diagram illustrating the relationship of the various parts of the invention in an exaggerated form for purposes of explanation. Referring to FIG. 3, the bearing pads 28, 30, 32, and 34 are arcuate in shape and their radii of curvature $R_p$ and $R_t$ are respectively greater than the radius $R_s$ of shaft 36 and the radius $R_b$ of the channel bottom in annular housing 12. In addition, the radius $R_p$ or $R_t$ of the pads 28, 30, 32, and 34 are eccentric with respect to the radius $R_s$ of the shaft and radius $R_b$ of the bottom of the pad-receiving channel. The difference in the radii is, however, only a few thousandths of an inch and, accordingly, it should be understood that the dimensions shown in FIG. 3 are exaggerated for the sake of illustration.

The difference in the radius of curvature between a pad and the housing produces a gap G of a few thousandths of an inch between the central portion of each pad and the adjacent housing surface and the difference in radius of curvature of a pad and the shaft produces gaps g between the ends of the pad and the surface of the shaft. The gaps G diminish in thickness toward the ends of the pad, and the gaps g increase in thickness toward the ends of the pad.

Thus, when shaft 36 vibrates, the dynamic loads generated in the oil film in gap g are transmitted to the bearing pad 34 and these loads are communicated to the bottom of the annular housing 12 at the end points C. This provides for a beam-type support for the vibratory forces and provides flexibility to safely absorb such forces. Since the bearing is flood lubricated, a pocket of oil will be trapped in gap G between the points C so as to provide a pocket of oil between the bottom of the channel in which a pad is seated and the adjacent surface of the pad. This pocket of oil is only a few thousandths of an inch thick at its thickest point so that it will provide "squeeze film" oil damping for vibrations of the bearing pad 28 when the pad center deflects toward the channel bottom. Thus the novel bearing pad configuration of this invention provides a flexible beam support for the vibratory motions of the shaft 36 and also a "squeeze film" damping of those vibratory motions. This combination enables the shaft to be rotated at higher speeds than heretofore known in the art.

Referring again to FIGS. 1 and 2, the four pads 28, 30, 32, and 34 are held in endwise position within their channel by means of machine screws 38 which are mounted in pairs as shown in FIG. 2 near the adjacent ends of the bearing pads, there being cup-shaped recesses 39 which overlap adjacent ends of two pads for receiving the screws 38. Below each cup-shaped recess 39 is an opening 37 which communicates with a transverse groove 35 as shown in FIGS. 1 and 2. Between the adjacent pairs of screws 38 four bores 40, 42, 44, and 46 are formed in the annular housing 12 for the passage of lubricating fluid between the shaft and the outer periphery of the annular housing 12. Matching openings 41, 43, 45, and 47 are formed in the ends of the pads 28, 30, 32, and 34 so that the lubricating oil can pass directly through the bores 40, 42, 44, and 46 to the shaft of the rotor.

From the foregoing description it will be apparent that this invention provides a flexible pad journal bearing which combines mechanical beam-type flexing in response to vibrations of the rotor shaft, and "squeeze film" oil damping therefor. Although this invention has been described in connection with one illustrative embodiment thereof, it should be understood that the invention is by no means limited to the disclosed embodiment, since many modifications can be made in the disclosed structure without altering its fundamental principles of operation. For example, although four bearing pads have been disclosed in this embodiment of the invention, it will be apparent to those skilled in the art that three sections or five sections might be used in different embodiments of the invention. This invention includes all such modifications as may fall within the scope of the following claims.

What I claim is:

1. A flexible pad journal bearing for a rotatable shaft, said bearing comprising an annular bearing housing having an annular pad-receiving channel formed in the inner periphery thereof, said channel having a bottom which is concentric with said rotatable shaft, a plurality of flexible metal pads positioned in endwise relationship within said channel, each of said pads being arcuate in shape in unassembled condition and sufficiently thick and of such material as to resist flexing unless subjected to substantial loads such as those imposed by the shaft, each pad maintaining its unassembled arcuate shape unless subjected to such loads, each pad having inner and outer radii of curvature which are slightly larger than the radius of said shaft and slightly larger than the radius of said channel bottom respectively, each pad having a radial thickness less than the radial distance between the shaft and channel bottom to provide inner and outer gaps which permit slight freedom of radial movement when not subjected to such loads, and lubricating fluid in said gaps between said shaft and said pads and between said pads and said channel bottom.

2. A flexible pad journal bearing for a rotatable shaft, said bearing comprising an annular bearing housing having an annular pad-receiving channel formed in the inner periphery thereof, said channel having a bottom which is concentric with said rotatable shaft, a plurality of flexible metal pads positioned in endwise relationship within said channel, each of said pads being arcuate in shape and having inner and outer radii of curvature which are slightly larger than the radius of said shaft and slightly larger than the radius of said channel bottom respectively, each pad having a radial thickness which is less than the radial distance between the shaft and the channel bottom, and lubricating fluid between said shaft and said pads and between said pads and said channel bottom, there being communicating bores formed in said annular housing and in said flexible pads for transmitting lubricating fluid from the outer periphery of said annular housing to the inner periphery thereof and to said shaft.

3. A flexible pad journal bearing as claimed in claim 2 in which bores in the pads intersect the adjacent ends of two pads.

4. A flexible pad journal bearing for a rotatable shaft, said bearing comprising an annular bearing housing having an annular pad-receiving channel formed in the inner periphery thereof, said channel having a bottom which is concentric with said rotatable shaft, a plurality of flexible metal pads positioned in endwise relationship within said channel, each of said pads being arcuate in shape and having inner and outer radii of curvature which are slightly larger than the radius of said shaft and slightly larger than the radius of said channel bottom respectively, each pad having a radial thickness which is less than the radial distance between the shaft and the channel bottom, and lubricating fluid between said shaft and said pads and between said pads and said channel bottom, there being screw means for holding said flexible pads in endwise alignment within said channel, said screw means comprising screws in the housing having heads which project into the pad-receiving channel, and there being cup-shaped recesses in the pads for receiving said heads.

5. A flexible pad journal bearing as defined in claim 4 in which each cup-shaped recess overlaps the adjacent ends of two pads.

6. A flexible pad journal bearing as claimed in claim 5 in which there are transverse grooves between the adjacent ends of pads and the shaft and in which there are openings affording communication between the cup-shaped recesses and said grooves.

* * * * *